United States Patent [19]

Immel

[11] 4,424,177

[45] Jan. 3, 1984

[54] MOLDING PREPUFFED POLYSTYRENE FOR HIGHER DENSITY SKIN

[75] Inventor: Richard H. Immel, West Chester, Pa.

[73] Assignee: Atlantic Richfield Company, Los Angeles, Calif.

[21] Appl. No.: 311,835

[22] Filed: Oct. 16, 1981

[51] Int. Cl.³ .................. B29D 27/00; B05D 1/06
[52] U.S. Cl. .................... 264/24; 264/45.4; 264/45.5; 264/51; 425/4 R
[58] Field of Search ............ 264/25, 51, 53, 24, 264/45.4, 45.5; 425/4 R

[56] References Cited

U.S. PATENT DOCUMENTS

| | | | |
|---|---|---|---|
| 2,451,934 | 10/1948 | Evans | 264/24 |
| 2,920,679 | 1/1960 | Sittel | |
| 2,954,589 | 10/1960 | Brown | 264/51 X |
| 3,187,381 | 6/1965 | Britten | 264/24 X |
| 3,278,656 | 10/1966 | Dicks et al. | 264/24 |
| 3,374,500 | 3/1968 | Drenning | 264/25 X |
| 3,478,387 | 11/1969 | Ruekberg | 264/24 |
| 3,488,411 | 1/1970 | Goldman | 264/24 |
| 3,491,170 | 1/1970 | Roe, Jr. | 264/24 |
| 3,607,998 | 9/1971 | Goodridge | 264/24 |
| 3,660,547 | 5/1972 | Ruekberg | 264/45.3 X |
| 3,833,692 | 9/1974 | Szatkowski | 264/24 |
| 3,943,212 | 3/1976 | Szatkowski | 264/24 |

*Primary Examiner*—Philip E. Anderson
*Attorney, Agent, or Firm*—Dennis M. Kozak

[57] ABSTRACT

An article having a relatively lower density polystyrene core and a relatively higher density polystyrene skin is prepared by a method in which a mold is supplied, simultaneously and/or sequentially with electrostatically charged prepuffs of a relatively higher density polystyrene and relatively uncharged low density prepuffs. The walls of the metal mold preferentially attract the electrostatically charged particles. The uncharged lower density prepuffs concentrate at the core. The thus filled mold is subjected to the heating and cooling cycle to provide a molded article having a core with a lower density than the skin.

4 Claims, 1 Drawing Figure

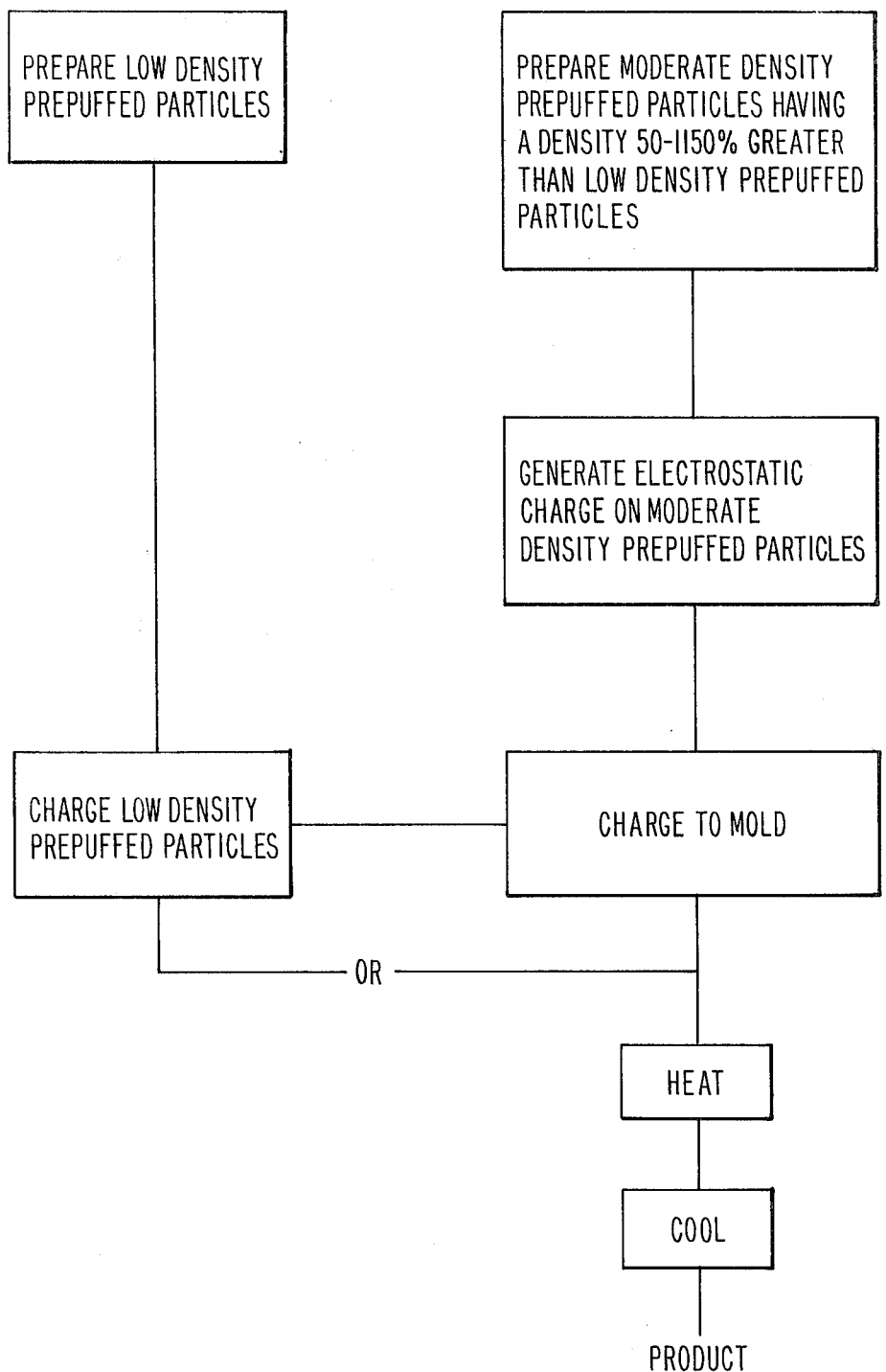

MOLDING PREPUFFED POLYSTYRENE FOR HIGHER DENSITY SKIN

FIELD OF THE INVENTION

This invention relates to cellular articles having a skin of relatively higher density than the core. The invention also relates to the utilization of electrostatic forces for preferentially adhering precursor material on the walls of the mold. The invention is particularly concerned with molding prepuffs, that is, expanded particles of polyvinyl aromatic hydrocarbons (e.g. styrene) using the general engineering featured in the prepuffed polystyrene technology.

PRIOR ART

ARCO Polymers, Inc. has published a brochure concerned with Dylite Expandable Polystyrene Technology, explaining that polystyrene particles containing a blowing agent such as pentane are produced for use in molding facilities having the equipment for preexpanding to prepare expanded particles generally designated as "prepuffs." Such prepuffs have a significantly lower density than the virgin beads but generally contain residual amounts of blowing agent sufficient to permit some further expansion in the mold. After a mold is filled with a bed of prepuffs, the mold is subjected to heat to achieve formation of an integral cellular plastic body lacking the interstices which characterize the bed of prepuffs. Such cellular plastic body is cooled to provide a cellular plastic article. The standard literature descriptions, including said "Dylite Expandable Polystyrene Technology" relating to the general technology of subjecting virgin beads to preexpansion to prepare prepuffs and the molding of prepuffs into a cellular article are deemed here reiterated and incorporated herein.

Small particles can be electrostatically charged and directed through a gas stream so that they are attracted toward and deposited on a surface which is either grounded or of a polarity opposite to that of such particles. Such electrostatic deposition phenomena have been applied to cleaning air, painting, rug making, and many other technologies, including the filling of molds for the preparation of plastic articles. Among the U.S. Pat. Nos. disclosing electrostatic methods for coating a mold are: Ruekberg, 3,660,547; Ruekberg, 3,478,387; Roe, Jr., 3,491,170; Evans, 2,451,934; Dicks et al, 3,278,656; Britten, 3,187,381; and Sittel, 2,920,679. Although a significant variety of plastic materials, including plastics containing thermally decomposible gas generators have been subjected to electrostatic fields in the prior art, it is believed that there has been no publication describing the utilization of electrodes imposing an electrostatic field upon prepuffs for the control of the filling of a mold with prepuffs.

Among the difficulties encountered in the handling of prepuffs has been the propensity of the prepuffs to develop electrostatic charges during the transfer from the preexpander to the mold. Technologists have known that it was essential that there be the electrical grounding of the conduits for airveyor transfer lines from the preexpander to the mold. The propensity for the buildup of electrostatic charges and/or aggregate clusters had been observed when polystyrene or similar plastic transfer tubes were utilized instead of metal tubes. Prior art technologists have sometimes sought to minimize the propensity for such development of an electrostatic charge on the prepuffs by coating the virgin beads and/or the prepuffs with an appropriate modifier altering the propensities to develop electrostatic charges.

Cellular articles made from polyurethane, polyvinyl chloride and related materials have had engineering advantages attributable to featuring relatively lower density at the core than at the skin. Various procedures have been employed for developing a tougher and higher density skin on an expanded polystyrene article after initial molding of such article. Various proposals have been made for preparing double-walled structures and conducting the molding of the prepuffs between such high density plastic walls.

Notwithstanding the long standing demand for articles having relatively lower density at the core than at the skin, and not withstanding the long standing recognition that molds can be made to attract electrostatically charged articles, prior art technologists concerned with the molding of prepuffs failed to develop commercial methods featuring electrostatically modified filling of molds for prepuffs.

SUMMARY OF INVENTION

In accordance with the present invention, an article having a relatively low density core and having a skin or relatively higher density is prepared by a method in which: low density prepuffed particles are prepared; moderate density prepuffed particles are separately prepared, said moderate density prepuffed particles having a density which is within the range from 50% to 1150% greater than the density of the low density prepuffed particles; subjecting the moderate density prepuffed particles to conditions imparting thereto a significant electrostatic charge, such charge being adequate to suspend at least a partial second layer of such electrostatically charged articles on the ceiling of a mold; directing such electrostatically charged moderate density prepuffed particles into the interior of a mold, whereby at least a layer of such moderate density prepuffed particles are formed on the mold walls; directing into the mold lower density prepuffed particles having minimized electrostatic charge, said low density prepuff particles filling the major volume of the mold by being less attracted to the mold walls than the electrostatically charged moderate density particle; heating the thus filled mold to bond together the low density prepuffs throughout most of the volume of the mold and to bond together the skin of moderate density prepuffed particles and to bond together the core and skin; cooling the thus molded article in the mold; and removing the thus cooled article from the mold, said article having a skin relatively higher density than the core.

BRIEF DESCRIPTION OF THE DRAWING

FIG. 1 is a flow diagram illustrating the method of the present invention.

The nature of the invention is further clarified by reference to a plurality of examples and controls.

EXAMPLE 1

A box type mold for preparing a celery box had metal walls which were electrically grounded. Two types of virgin beads were selected which differed in that one type had a distinctive brown color and the other was white. The prepuffing conditions were so controlled that the brown prepuffs had a density of 0.75 pounds per cubic foot and the white prepuffs had a density of 3 pounds per cubic foot. The relatively higher density white prepuffs were about 400% of the density of the lower density brown prepuffs and thus within the range of being from 50% to 1150% greater than the density of the lighter prepuffs. By a series of tests, it was established that relatively more dense prepuff should be from about 50% to 1150% more dense than the relatively less dense prepuff.

A bed of white prepuffs was subjected to significant aeration. As a result of the rubbing together of the polystyrene prepuffs, each of the prepuffed particles developed a significant electrostatic charge approximately equivalent to directing a stream of such white prepuffs through the zone of an electrostatic field featuring high voltage wires. The electrostatically charged white prepuffs entered the mold through a blow-fill gun, and electrostatically adhered to the mold walls.

The brown prepuffs were well grounded and free from electrostatic charge just prior to being directed into the celery box mold through a blow-fill gun. In various testing procedures using separate filling guns sequentially and simultaneously and in a single gun sequentially and simultaneously it was established that all four approaches are operable. Simultaneous use of 2 guns had some engineering advantages.

After the mold is filled, it is heated to molding temperature. The residual blowing agent promotes further expansion of each prepuff, whereby the expanded plastic particles fuse to each other to provide a hot precursor. The brown prepuffs bond to each other and the white prepuffs bond to each other and the brown prepuffs bond to the white prepuffs during such molding step. The precursor is cooled in the mold until it has the strength necessary for removal from the mold. Because the cellular plastic is an insulator, care must be exercised to assure adequate cooling prior to removal from the mold, and the cooling of the article continues after removal from the mold.

Analysis and sectional cutting of the molded article provides evidence that the white prepuffed particles are overwhelmingly at the skin, which is entirely white, thus showing excellent separation of the 2 colors by electrostatic segregation. The skin was relatively thin because the initial volume of brown beads was four times that of the white beads, so that each skin was only a few percent of the total thickness of the molded article. This brown-cored celery box established the fundamental workability of the duo-density process, but left unanswered various questions concerning the effects of complex cavities in molds, operable ranges of differences in density of the two varieties of particles, minimum and maximum skin thickness, and related problems of commercial interest.

EXAMPLE 2

A mold for an insulation panel is designed to produce panels which are 96×48×6 inches for use in cold storage warehouse construction. The mold is in two parts, comprising two open boxes of 3-inch depth.

Two varieties of virgin beads are prepared. A bead having an initial diameter of 0.57 mm is scheduled for preparing a prepuffed particle having a moderate density of 7 pounds per cubic foot (ppcf) and a diameter of 1 mm. A bead having an initial diameter of 0.52 mm is scheduled for preparing a prepuffed particle having a density of 0.7 ppcf and a diameter of 2 mm. The unit ratio of the densities of the prepuffs is 10, and the moderate density prepuff is 900% greater than the lower density prepuff.

The moderate density prepuffs are directed as a stream of falling curtain between the wires and plate of a high voltage electrostatic field, using modifications of the Ransberg electrostatic spray painting systems, and then to a blow-fill gun for distribution on the walls of each of the half molds, which are electrically insulated and electrostatically charged oppositely to the prepuffs. Because the metal walls are not grounded, the duration of the electrostatic adhesion of the prepuffs to the ceiling of the closed mold is significantly prolonged. It is important that such electrostatic coating of the mold walls with moderate density prepuffs have a durability sufficient to permit the filling of the mold with low density prepuffs.

The low density prepuffs are directed to the interior of the coated mold through a grounded blow-fill gun imparting minimized electrostatic charge to such low density prepuffs. The volume ratio of low density prepuffs to moderate density prepuffs is about 20 to 1. The thus filled mold is heated to molding temperature and maintained at molding temperature for a time sufficient to soften the innermost prepuffs.

After the heating has been conducted long enough to soften the innermost prepuffs, the cooling cycle is initiated, desirably using cooling water in the heat transfer chambers adjacent to the mold walls. Because the panel is so thick, a much longer cooling cycle is required. After the panel is adquately cooled, it is removed from the mold. The density of the panel is about 1 ppcf but the crushing strength and related mechanical properties of the panel are generally equivalent to a panel having a density of about 1.5 ppcf. The savings of about one third in the materials required for achieving the desired mechanical properties provides a basis for using the more complicated duo-density process.

EXAMPLE 3

In a foundry in which differential housings are cast, the patterns are molded from prepuffs, so that the molten metal displaces and volatilizes the cellular polystyrene during the metal casting step. "Expandable Polystyrene and its Processing Into Patterns for The Evaporative Casting Process" by R. H. Immel, American Foundrymen's Society Transactions 87,545,550 (1979) describes this process and is deemed here reiterated and incorporated herein. By using the duo density process described in Example 2, the savings in the material costs justifies the more complicated procedure. Moreover, the smoother skin of the pattern leads to metal castings having a smoother surface. In modifications of the pattern production, it is shown that prepuffs having a density such as 10 ppcf are useful skin formers and permit formation of patterns having thin webs (no low density core therein) which might have been too fragile using conventional single density prepuffs.

EXAMPLE 4

By a series of tests it is established that the duo-density process requires the utilization of thermoplastic particles (ordinarily spheroidal beads containing a volatile solvent volatilized at temperatures at which the thermoplastic composition undergoes plastic softening) which can be converted to prepuffed particles in the commercially utilized standard type of prepuffing equipment. It is customary that such expandable beads be predominately polystyrene containing a controlled amount of pentane blowing agent. Pentane exemplifies a volatile solvent distinguishable from a compound which generates gas by chemical decomposition, which compounds are excluded from blowing agents as used herein.

Separately prepared are two types of prepuffs. The moderate density prepuffed particle has a density which is from 50% to 1150% greater than that of the low density prepuff. For example, the heavier prepuffs can be 500% greater in bulk density than the light prepuffs. The moderate density prepuffed particle is processed to impart an electrostatic charge thereto. Such charging is desirably achieved by subjecting the prepuffs to the elecrostatic field between a plate and a grid of wires energized by a high voltage low microamperage current. Using an air stream to turbulently suspend prepuffs from a bed of particles also imposes an electrostatic charge on the prepuffs. The electrostatically charged prepuffed moderate density prepuffs are directed into the empty mold having metallic walls, either grounded or maintained at an opposite electrostatic charge. Promptly after such coating of the mold walls with moderate density prepuffed particles (even partially simultaneously) the main portion of the mold is filled with uncharged low density prepuffed particles. Thereafter the conventional heating, cooling, and removal of the molded article are conducted. The method produces a duo-density article having an expanded cellular skin which has a density which is 50% to 1150% greater than the core density.

EXAMPLE 5

All of the general steps of the present invention can be understood without reference to a drawing. No drawing is deemed appropriate but data are provided so that there would be no new matter in amending the application to include a drawing. If of the flow sheet type, two sources of supply of prepuffed particles could be shown, with the low density prepuffed particles being directed from such supply directly to the mold-filling step, and with the moderate density prepuffed particles passing through an electrostatic charging zone between supply and mold-filling step. All subsequent steps are conventional, but could be shown on a flow sheet as heating, cooling, and article-removing steps. If any figure showing a zone for imparting an electrostatic charge were required (deemed not appropriate and unnecessary) it would show a V-bottomed bin having an effluent slot permitting moderate density prepuffed particles to fall as a monolayer curtain toward the collecting funnel of a gun sending the prepuffed particles into the mold. During the free fall from the supply bin to the collecting funnel, the falling curtain of moderate density prepuffed particles would be subjected to one or more zones of an electrostatic field in which a high voltage low amperage fine wire grid would be spaced horizontally on the opposite side of the falling curtain from a grounding electrode (e.g. a metal plate), so that the prepuffed particles would fall through the zone in which ionized air components conducted an electric current and created an electrostatic field.

Various modifications of the invention are possible without departing from the scope of the appended claims.

The invention claimed is:

1. The method of preparing an article having a relatively low density core and having a skin of relatively higher density, which method includes the steps of:
   preparing low density prepuffed particles;
   preparing separately moderate density prepuffed particles, said moderate density prepuffed particles having a density which is within the range from 50% to 1150% greater than the density of the low density prepuffed particles;
   generating on the surface of the moderate density prepuffed particles a significant electrostatic charge, such charge being adequate to suspend at least a partial second layer of such electrostatically charged particles on the ceiling of a mold;
   directing such electrostatically charged, moderate density prepuffed particles into the interior of a mold, whereby at least a layer of such moderate density prepuffed particles are formed on the mold walls;
   directing into the mold lower density prepuffed particles having minimized electrostatic charge, said low density prepuffed particles filling the major volume of the mold by being less attracted to the mold walls than said electrostatically charged moderate density particles, said directing of the low density prepuffed particles being promptly after and/or simultaneous with said directing of the moderate density prepuffed particles;
   heating the thus filled mold to bond together the low density prepuffs throughout most of the volume of the mold and to bond together the skin of moderate density prepuffed particles and to bond together the core and skin;
   cooling the thus molded article in the mold;
   and removing the thus cooled article from the mold, said article having a skin of relatively higher density than the core.

2. The invention of claim 1 in which the moderate density prepuffed particles and low density prepuffed particles are all approximately spherodial in shape.

3. The invention of claim 2 in which the low density spheroids have an average diameter which is from about 50% to 200% the diameter of the moderate density spheroids so that there are minimized propensities for moderate density spheroids to be trapped in the intertices of a bed of low density prepuffed spheroids.

4. The invention of claim 1 in which the thermoplastic particles are particles of a polymer composition derived from monomers in which at least a major portion is styrene.

* * * * *